Oct. 28, 1941.　　　　H. M. WILKOFF　　　　2,260,761
ELECTRIC CORD OR CABLE
Filed Dec. 14, 1938
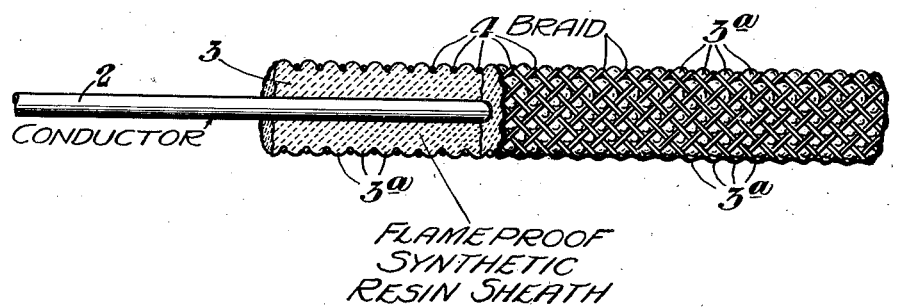
Inventor:
HOWARD M. WILKOFF,
by: John E. Jackson
his Attorneys.

UNITED STATES PATENT OFFICE 2,260,761

ELECTRIC CORD OR CABLE

Howard M. Wilkoff, Worcester, Mass., assignor to The American Steel and Wire Company of New Jersey, a corporation of New Jersey Application December 14, 1938, Serial No. 245,766

1 Claim. (Cl. 174—121)

This invention relates to electric cords or cables, one of the objects being to produce an insulated conductor particularly adapted to the wiring of switchboards and electric panels.

A specific example of a cord embodying the principles of the present invention is illustrated by the accompanying drawing.

More particularly, a conductor 2 in the form of either a solid wire or a stranded element is covered by a flameproof synthetic resin sheath 3 over which a braid jacket 4 is applied. The product is finally subjected to sufficient heat to cause the resin sheath 3 to expand and bulge outwardly through the interstices of the braid jacket 4 to a sufficient extent to constitute visible projections 3a.

By compounding a coloring pigment with the resin sheath 3 a very decorative and easily identified product results. Furthermore, since a flameproof resin is used, the protuberances projecting through the interstices of the braid jacket 4 function to prevent the latter from burning freely even if made of combustible material.

Specifically referring to the manufacture, the conductor is sheathed with a suitable thermoplastic resinous material having flameproof characteristics, after which the braid jacket is applied over this material, the latter being then heated so that the resinous material expands and protrudes through the braid interstices to a sufficient extent to constitute distinct projections plainly visible to the eye.

The braid jacket 4 may be braided from cotton, asbestos, silk, rayon, linen, glass, jute, etc.

As to the resin used, there are many suitable types known to those skilled in the art. These are formed basically by copolymerizing either vinyl chloride and vinyl acetate, or vinyl chloride and acrylic acid, or by polymerizing vinyl chloride. After the combination has been decided upon the polymerized resin may be suitably plasticized, colored and compounded to effect an extrudable material having the desired plasticity, flameproofness and color.

Selection of the above resins depends upon the particular application for which the cord or cable is intended. It has been found by the present inventor that should temperature be an outstanding factor, polymerized vinyl chloride is most desirable. On the other hand, if electrical properties are of prime importance, a copolymerized vinyl chloride and acrylic acid would be most suitable. Where temperature and electrical properties are normal, a vinyl chloride and vinyl acetate copolymerized, suitably plasticized and compounded, will adequately answer all requirements.

I claim:

An electric cord or cable including a conductor, a flameproof synthetic resin sheath over said conductor and a braid jacket over said sheath, the latter projecting through the interstices of said jacket to a sufficient extent to constitute protuberances protecting said braid jacket from flaming, said jacket and said protuberances being exposed to view in the normal use of said cord or cable.

HOWARD M. WILKOFF.